May 26, 1959     D. E. GRISWOLD     2,888,032
FLOW RATE CONTROLLER

Filed Oct. 27, 1952     2 Sheets-Sheet 1

INVENTOR
David E. Griswold
BY Bacon + Thomas
ATTORNEYS

May 26, 1959

D. E. GRISWOLD 2,888,032

FLOW RATE CONTROLLER

Filed Oct. 27, 1952

INVENTOR
David E. Griswold

BY Bacon + Thomas

ATTORNEYS

United States Patent Office 2,888,032
Patented May 26, 1959

2,888,032

FLOW RATE CONTROLLER

David E. Griswold, San Marino, Calif., assignor to Donald G. Griswold, Alhambra, Calif.

Application October 27, 1952, Serial No. 316,973

3 Claims. (Cl. 137—486)

The present invention relates to a flow rate controller and, more particularly, to a flow rate controller including a main valve for maintaining a desired constant rate of fluid flow through a pipeline or the like, irrespective of variations in pressure on the upstream side of the main valve.

More specifically, the invention relates to a flow rate controller including a fluid pressure operable main valve and an automatic pressure-responsive pilot valve operable by the differential pressure across an orifice on one side of the main valve for controlling the main valve in a manner to maintain a constant rate of flow.

The principal object of the invention is to provide fully automatic and accurate means for maintaining a substantially uniform rate of flow of fluid in a pipeline.

Another object of the invention is to provide automatic flow rate control means which is sensitive to the differential of pressures taken at different points along a pipeline, for example, on opposite sides of a flow restricting orifice located either upstream or downstream with respect to a main valve through which the rate of flow is to be controlled.

A further and more specific object of the invention is to provide an automatic flow rate control unit including a fluid pressure operated main valve and an adjustable pilot valve controlling said main valve for maintaining any desired constant flow rate within the capacity of the main valve.

Another object of the invention is to provide a pilot valve for controlling the rate of flow through a main valve and which pilot valve is responsive to the pressure differential at different points in a pipeline in which the main valve is connected and includes a valve stem and means for balancing the pressures acting on the valve stem.

Other objects and features of the invention will be apparent from the following description taken in conjunction with the accompanying drawings, in which.

Figure 1:
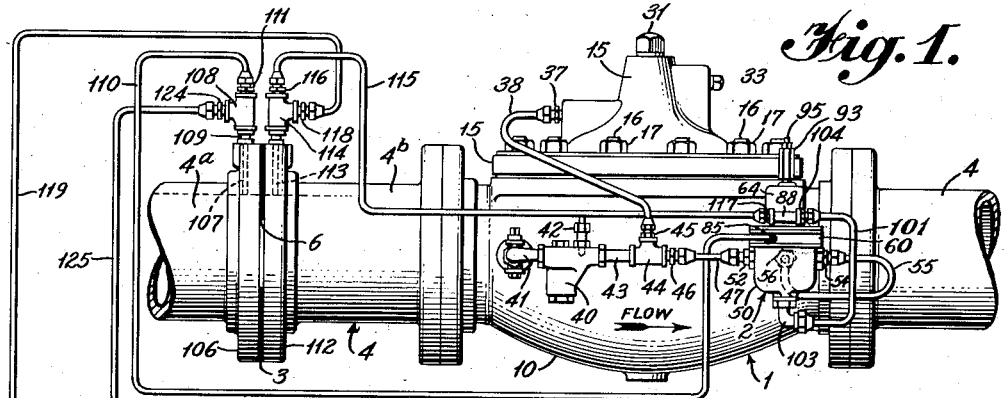
Fig. 1 is a side elevational view of a pipeline and flow rate control unit including a main valve and a pilot valve control therefor embodying the principles of the present invention.

Referring now to Fig. 1, the rate of flow control device comprises a hydraulically operated, diaphragm-type globe valve 1, which is controlled by a pilot valve 2 actuated in accordance with the pressure differential across an orifice plate 3, diagrammatically indicated as connected in a pipe 4 on the upstream side of the main valve 1. A known type of manometer 5 is connected across the orifice plate 3 to visibly indicate the rate of flow. It is to be understood that the orifice plate 3 may be mounted in the pipe 4 on either the upstream or downstream sides of the main valve 1 with equally good results.

Figure 2:
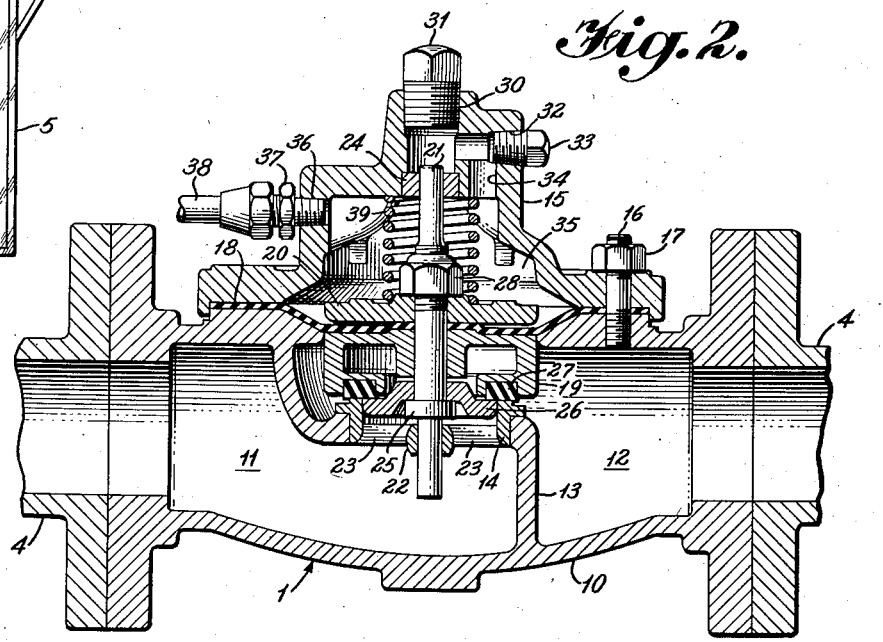
Fig. 2 is a vertical sectional view through the main valve shown in Fig. 1.

Referring now to Fig. 2, the main valve 1 comprises a body 10 provided with an inlet chamber 11 and an outlet chamber 12. A partition 13 in the valve body 10 separates the chambers 11 and 12 and serves as a support for a valve seat 14. A cover 15 is secured to the valve body 10 by means of a plurality of studs 16 and nuts 17, a flexible conventional diaphragm 18 being interposed between said valve body and cover.

A diaphragm-supporting plate 19 is disposed in the body 10 below the diaphragm 18 and another supporting plate 20 is disposed in the cover 15 above said diaphragm. A valve stem 21 extends through the diaphragm 18 and its supporting plates 19 and 20 and is slidably mounted at its lower end in a guide 22 supported by arms 23 connected with the seat 14. The upper end of the valve stem 21 is guided in a bushing 24 mounted in the cover 15. The stem 21 has a shoulder 25 disposed above the guide 22, which serves as an abutment for a disc 26. The supporting plate 19 has an annular groove formed in the lower face thereof in which a sealing ring 27 is disposed and held in place by the outer marginal portion of the disc 26. The stem 21 is threaded in the region of the plate 20 and a self-locking nut 28 is threaded thereon to secure the diaphragm 18, supporting plates 19 and 20, disc 26, and sealing ring 27 in assembled relation. The sealing ring 27 is cooperable with the seat 14 to control the flow of fluid through the main valve 1.

The cover 15 has a central threaded opening 30 above the stem 21 which is closed by a conventional pipe plug 31. A threaded opening 32 is formed in a lateral boss on the cover 15 and its outer end is similarly closed by a plug 33. An upright passageway 34 establishes communication between the opening 32 and a pressure chamber 35 formed within the cover 15, so that the upper end of the valve stem 21 is subject to the pressure in the chamber 35. Another lateral boss has a threaded opening 36 in which a conventional fitting 37 is mounted. One end of a conduit 38 is connected to the fitting 37 for the purpose of conducting operating fluid to and from the diaphragm pressure chamber 35, as will be explained more fully hereinafter. A compression spring 39 is disposed in the chamber 35 between the cover 15 and the plate 20 and constantly tends to urge the valve stem 21 downwardly to its valve closing position against line pressure.

An orifice equipped strainer 40 (Fig. 1) of known construction has the inlet side thereof connected by suitable pipe fittings 41 to the inlet chamber 11 of the main valve 1. A needle valve 42 is mounted on the strainer 40 for controlling the rate of flow through the strainer. One end of a pipe nipple 43 is connected with the outlet of the strainer 40 and its opposite end is connected to one end of a pipe-T 44. A conventional fitting 45 is mounted in the stem of the T and one end of the conduit 38, previously referred to, is connected to said fitting for conducting operating fluid from the inlet chamber 11 to the diaphragm pressure chamber 35. A conventional fitting 46 is mounted in the other side of the pipe-T 44 and one end of a conduit 47 is connected to said fitting.

Figure 3:
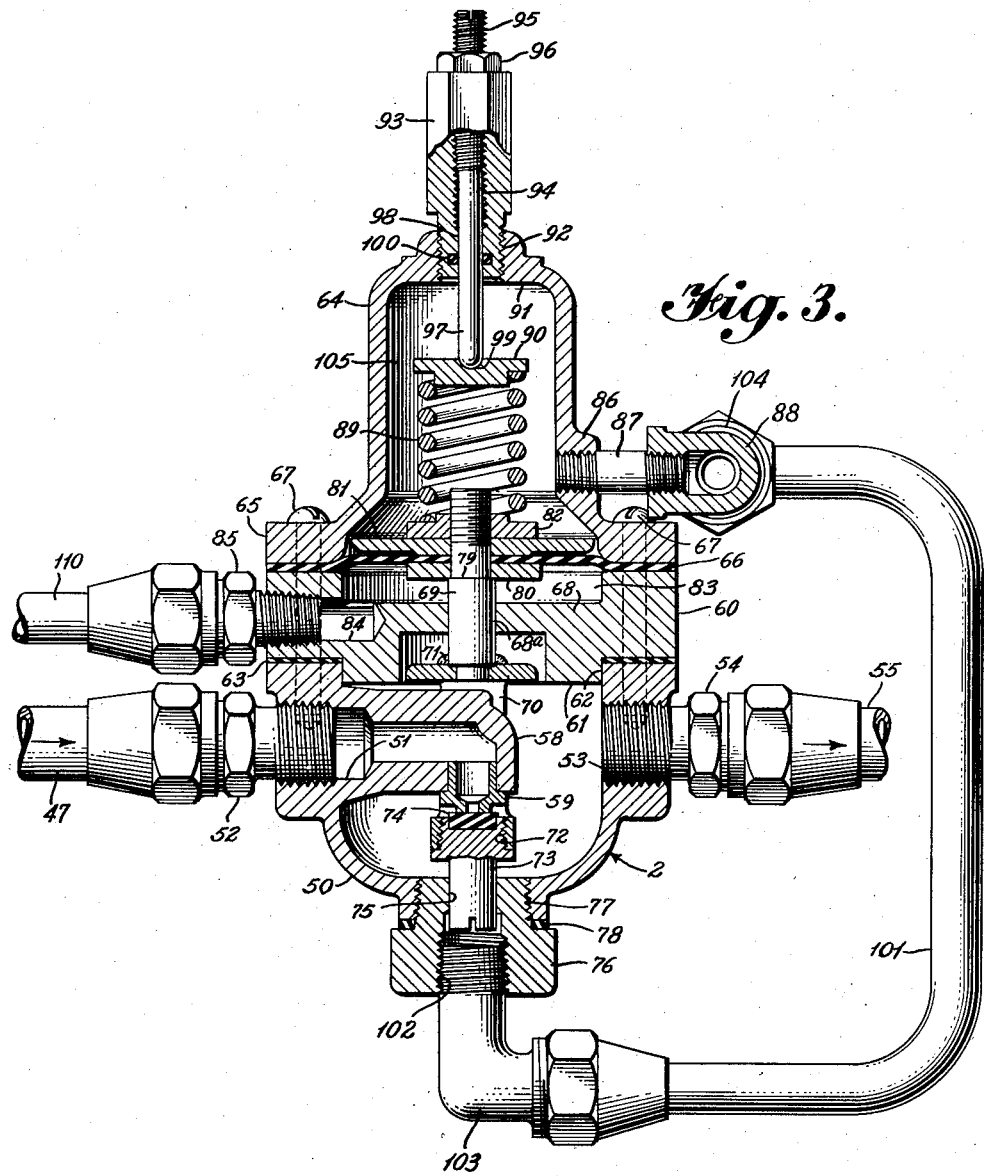
Fig. 3 is a vertical sectional view through the pilot valve shown in Fig. 1.

Referring now to Fig. 3, the pilot valve 2 comprises a body 50 having an inlet passage 51 which is threaded and has a conventional pipe fitting 52 mounted therein. The opposite end of the conduit 47 is connected to this fitting. The body 50 also has a threaded outlet opening 53 in which another conventional fitting 54 is mounted. A discharge conduit 55 has one end thereof connected to the fitting 54 and its other end connected with the outlet chamber 12 of the main valve 1 by a fitting 56 (Fig. 1). The return of the discharge from the pilot valve 50 to the outlet 12 of the main valve 1 contributes to the accuracy of the flow rate control and, moreover, is particularly desirable when the apparatus is being used to control the flow rate of inflammable liquids, such as gasoline, in order to avoid a fire hazard.

A partition 58 extends from the inlet opening 51 and has an inverted seat 59 mounted thereon. An intermediate valve section 60 has a depending boss 61 which projects into and is snugly received in an opening 62 at the upper end of the body 50. An annular gasket 63 is interposed between the adjacent faces of the body 50 and the intermediate section 60 to form a fluid-tight seal therebetween. A cover 64 has a flange 65 at its lower end and rests upon a suitable diaphragm 66 interposed between said flange and the upper face of the intermediate valve section 60. A plurality of screws 67 extend through aligned openings in the flange 65, the diaphragm 66, the intermediate valve section 60, the gasket 63 and the lower ends thereof are threaded into suitable holes in the valve body 50 so that when these screws are tightened, the named parts are assembled in leak-proof relation.

The valve section 60 has a transverse wall 68 provided with an opening 68$^a$ in which a valve stem section 69 is slidably mounted. A yoke 70 is welded to the stem part 69, as indicated at 71. The yoke 70 surrounds the inner end of the partition 58 and has a threaded opening 72 at its lower end in which the upper end of a second stem part 73 is mounted. The stem part 73 has a lower end of the same diameter as the portion of the stem part 69, which slides in the opening 68$^a$. The stem part 73 is recessed on its upper end face to receive a valve disc 74 cooperable with the seat 59 to control the flow between the inlet opening 51 and the outlet opening 53 of the pilot valve 2. The lower end of the stem part 73 is slidably mounted in a passage 75 formed in a plug 76 mounted in a threaded opening 77 in the valve body 50. A gasket 78 is disposed between the valve body 50 and the head of the plug 76 to form a seal.

The valve stem part 69 has a shoulder 79 disposed above the transverse wall 68 and adapted to form an abutment for a lower diaphragm-supporting plate 80 on the lower side of the diaphragm 66. A somewhat larger plate 81 is mounted upon the stem 69 above the diaphragm 66 and a nut 82 is mounted upon the upper threaded end of the stem 69 to maintain the diaphragm-supporting plates 80 and 81 and the diaphragm 66 in assembled relation with the valve stem part 69. The valve section 60 is recessed to provide a pressure chamber 83 at the lower side of the diaphragm 66 and a radial passageway 84 formed in said section communicates with said chamber. A conventional pipe fitting 85 is mounted in the outer end of the passageway 84 for a purpose which will be described later. The cover 64 has a threaded boss 86 in which a conventional pipe nipple 87 is mounted and has the stem of a pipe-T 88 connected thereto for a purpose which will also be described later. A compression spring 89 is disposed within the cover 64 and its lower end is engaged with the nut 82 and its upper end is engaged with a disc 90. The cover 64 has an upper end wall 91 provided with a threaded opening 92 in which a fitting 93 is mounted. The fitting 93 has an internally threaded opening 94 and an adjusting screw 95 is mounted in said opening and retained in adjusted position by a jam nut 96. The lower end 97 of the adjusting screw 95 is plain and cylindrical and projects through a smooth opening 98 in the fitting 93 and into a hemispherical recess 99 formed centrally in the disc 90. A conventional O-ring packing 100 is carried by the fitting 93 in surrounding relation to the portion 97 of the adjusting screw 95 and forms a seal therewith.

A pressure equalizer tube 101 has one end thereof connected with a threaded opening 102 in the plug 76 by a conventional fitting 103. The opposite end of the equalizer tube 101 is connected with one side of the pipe-T 88 by a conventional fitting 104. Thus, any fluid pressure existing in the chamber 105 of the cover 64 is communicated through the equalizer tube 101 to the plug 76 and acts against the lower face of the stem part 73 for balancing the pressure on the opposite ends of the valve stem to thereby prevent the occurrence of an unbalanced force which would result from the pressure differential between the outlet opening 53 of the pilot valve 2 and the hydraulic pressure in the chamber 105 which would undesirably influence the operation of the pilot valve. It will be appreciated that the pressure in the chamber 105, taken from the downstream side of the orifice plate 3, will vary in relation to the pressure at the outlet opening 53 of the pilot valve 2, or the outlet chamber 12 of the main valve 1, without having any direct bearing on the rate of flow through the main valve, and which rate of flow is the factor to be controlled by the apparatus. By balancing the pressures on the valve stem 69—73 the variable pressures that might otherwise influence the action of the pilot valve 2 are eliminated.

The pipeline 4 includes pipe sections 4$^a$ and 4$^b$ having their adjacent ends spaced apart to receive the orifice plate 3 therebetween, which has the orifice opening 6, as diagrammatically illustrated in Fig. 1. The pipe section 4$^a$ has a flange 106 provided with a drilled orifice 107 located on the upstream side of the orifice plate 3. One side of a conventional pipe-T 108 is connected with the orifice opening by a pipe nipple 109. One end of a conduit 110 is connected to the other side of the pipe-T by a fitting 111 and the opposite end of the conduit 110 is connected to the fitting 85, previously referred to, whereby the pressure at the upstream side of the orifice plate 3 is communicated to the chamber 83 of the pilot valve 2 at the lower side of the diaphragm 66. The pipe section 4$^b$ has a flange 112 in which a similar orifice 113 is drilled on the downstream side of the orifice plate 3. A pipe-T 114 is similarly connected with the orifice 103 and one end of a conduit 115 is connected to one side of the pipe-T by a conventional fitting 116 and the opposite end of said conduit is connected by a conventional fitting 117 to one side of the pipe-T 88, it being recalled that the equalizer tube 101 is connected to the other side of said pipe-T. Thus, the pressure in the pipe section 4$^b$ on the downstream side of the orifice plate 3 is communicated through the conduit 115 to the pressure chamber 105 in the cover 64.

A conventional fitting 118 is mounted in the stem of the pipe-T 114 and one end of a conduit 119 is connected to said fitting. The opposite end of the conduit 119 is connected by a conventional fitting 120 to the stem of a pipe-T 121. One side of the pipe-T 121 is connected by a conduit 122 to the conventional flow indicator or manometer 5, and the opposite side of said pipe-T has a bleed valve 123 connected therewith. The stem of the pipe-T 108 has a conventional fitting 124 mounted therein to which one end of a conduit 125 is connected, the opposite end of the conduit being connected by a conventional fitting 126 with the stem of a pipe-T 127. The lower side of the pipe-T 127 is connected by a conduit 128 to the manometer 5. A bleed valve 129 is connected to the opposite side of the pipe-T 127. A by-pass conduit 129$^a$ containing a by-pass valve 130 interconnects the conduits 122 and 128, as shown, for by-passing fluid around the manometer 5.

It will be apparent from the foregoing description that the diaphragm pressure chamber 35 of the main valve 1 is in constant communication with the inlet chamber 11 of said valve through the pipe fittings 41, strainer 40, pipe nipple 43, pipe-T 44 and the conduit 38, so that line pressure is always available to effect closing of the main valve. The maximum rate of flow of operating fluid toward the pressure chamber 35 is regulated by the adjustment of the needle valve 42 and determines the maximum possible closing rate of the main valve 1. It will also be apparent that whether the operating fluid flows through the conduit 38 to the pressure chamber 35 of the main valve 1, or by-passes the pressure chamber through the pilot valve 2, will depend upon the extent to which the pilot valve 2 has been opened in response to the differential pressure across the orifice plate 3 and the "set" force exerted by the spring 89. It will be understood, of course, that the pilot valve 2 has a maximum flow rate greater than that permitted by the needle valve 42 so that operating fluid can be drained from the pressure chamber 35 faster than fluid can flow past the needle valve 42 toward said chamber when conditions so require. Thus, the extent of opening of the main valve 1 is controlled in accordance with the extent of opening of the pilot valve 2, and the pilot valve 2 controls the flow of operating fluid in a manner to either cause the main valve 1 to open further, or to partially close, as required, in order to maintain the desired constant rate of flow through the main valve 1. Such control is effected as follows:

Since the pilot diaphragm 66 is subject to the differential pressure in the pipeline 4 on the opposite sides of the orifice plate 3, the main valve 1 will be caused to function in accordance with the variations that occur in these pressures. The force exerted by the spring 89 acting downwardly upon the diaphragm 66 combines with the pressure on the downstream side of the orifice 6 and communicated to the pressure chamber 105 through the conduit 115, to urge the pilot valve 2 toward open position, and these combined forces are opposed by the pressure on the upstream side of the orifice 6 communicated to the pressure chamber 83 at the lower side of the diaphragm 66 through the conduit 110.

Let it be assumed that with an orifice 6 of a selected size, a pressure drop or differential of 10#/sq. in. across the orifice plate 3 will provide the desired uniform flow rate. With the orifice 6 producing a pressure differential of 10#/sq. in. in the pipeline 4, at the desired flow rate, the spring 89 is adjusted so that, when the fluid pressure differential across the orifice plate 3 and the diaphragm 66 is more than 10#/sq. in., the resulting hydraulically produced force is greater than the "set" pressure of the spring 89, and the valve stem 69—73 will be moved upwardly toward closed position or modulate to restrict or vary the flow through the main valve 1, as required, in order to maintain the desired uniform flow rate.

The flow rate through the main valve 1 can be changed simply by adjusting the screw 95 to increase the "set" force that must be overcome by the pressure on the upstream side of the orifice plate 3. Thus, to increase the flow rate through the main valve 1, the screw 95 is adjusted clockwise, whereas to decrease the flow rate the screw is turned counterclockwise. Clockwise adjustment of the screw increases the compression on the spring 89 and correspondingly increases the "set" force, whereas counterclockwise adjustment of the screw 95 relieves the compression of the spring 89 and decreases the "set" force. As an example, the flow rate control device can be adjusted to vary the constant flow rate through the main valve 1 over a range of from 75 to 250 gallons per minute. Any change in the flow rate causes a corresponding change in the pressure differential, and the pilot valve 2 responds instantly to counteract this change. For example, if the flow rate through the main valve 1 should increase due to an increase in the inlet pressure, the differential pressure would, in turn, increase and this added force acting against the spring 89 would act to close the pilot valve 2. Closing of the pilot valve would result in increasing the pressure in the main diaphragm chamber 35 of the main valve 1, thus forcing the sealing ring 27 toward its seat. This will result in a corrective action modifying the flow through the main valve to return the flow to its original desired constant rate.

As the differential pressure decreases, the spring 89 forces the pilot valve 2 toward open position. The equalizer line 101 serves to equalize the forces across the valve stem area to effect a more accurate control of the main valve 1 by the pilot valve 2.

While some slight leakage may occur along the valve stem section 69 where it passes through the opening 68a in the transverse wall 68, this is not detrimental to the operation of either the pilot valve 2 or the flow control unit as a whole, since the pilot valve 2 is designed to control the rate of flow of operating fluid through the main valve 1, which is normally more or less open and not closed drip-tight. The described construction eliminates a sealing ring around the valve stem 69 and thereby avoids the frictional drag which would be imposed on the stem by such sealing ring. Any leakage along the stem 69 would pass out of the pilot valve through the conduit 55 along with the bled operating fluid without any undesirable effects on the control of the main valve 1 exerted by the pilot valve 2.

It will be understood that various changes may be made in the details of construction and in the arrangement of the parts of the flow control valve disclosed herein, without departing from the spirit of the present invention or from the scope of the annexed claims.

I claim:

1. Flow rate control means, comprising: conduit means for conducting fluid; a main valve connected in said conduit means having an inlet chamber, an outlet chamber, a pressure chamber for operating fluid and a fluid pressure operable diaphragm element subject on its lower side to line pressure and subject on its upper side to the pressure of operating fluid in said pressure chamber and having a closure member connected thereto movable toward closed position against line pressure in said inlet chamber by operating fluid pressure in said pressure chamber for controlling flow between said inlet and outlet chambers; a spring in said pressure chamber constantly exerting force opposing movement of said element toward open position and being effective to automatically close said main valve upon line pressure failure; an automatic pressure differential operated pilot valve having an inlet and an outlet; means connecting the inlet of said pilot valve with the inlet chamber of said main valve and with the pressure chamber of said main valve, said pilot valve comprising a valve stem operable to control flow through said pilot valve and a diaphragm connected with said valve stem, said pilot valve having pressure chambers on the opposite sides of said diaphragm in non-communicating relation with its inlet; flow restricting orifice means in said conduit means; means connecting the pressure chambers of said pilot valve with said conduit means on the upstream and downstream sides, respectively, of said orifice means; and resilient means exerting a force of a set value on said pilot valve diaphragm acting in the same direction as the pressure derived from the downstream side of said orifice means, whereby said pilot valve is operable to control the admission and exhaust of operating fluid from said pressure chamber of said main valve to effect closing and opening of said main valve in accordance with the pressure differential acting upon the pilot valve diaphragm in conjunction with the force exerted by said yieldable means.

2. Flow rate control means, comprising: a pipeline; a fluid pressure operable main valve connected in said pipeline and having an inlet chamber, an outlet chamber, a pressure chamber for operating fluid, and a fluid pressure operable diaphragm element subject on its lower side to line pressure and subject on its upper side to the pressure in said pressure chamber and having a closure member connected thereto movable toward closed position against line pressure in said inlet chamber by operating fluid pressure in said pressure chamber for controlling flow between said inlet and outlet chambers; a spring in said pressure chamber constantly exerting force opposing movement of said element toward open position and being effective to automatically close said main valve upon line pressure failure; an automatic pressure differential operated pilot valve including a body having an inlet, an outlet and a pressure-responsive member for controlling flow therebetween, said pilot valve including a diaphragm connected with said pressure-responsive member and having a pressure chamber on the upper and lower sides of said diaphragm in non-communicating relation with its inlet; means connecting the inlet side of said pilot valve with the inlet chamber of said main valve and with the pressure chamber of said main valve; an orifice plate connected in said pipeline on the inlet side of said main valve; conduits having one end thereof connected with said pipeline on the upstream and downstream sides of said orifice plate, respectively, and having the opposite ends thereof connected with the pressure chambers at the lower and upper sides, respectively, of said pilot diaphragm; and resilient means exerting a force of a set value opposing the pressure derived from the upstream side of said orifice means and acting on the pilot diaphragm in the same direction as the pressure derived from the downstream side of said orifice means for controlling said operating fluid to cause the main valve to maintain a constant rate of flow through said pipeline.

3. Flow rate control means as defined in claim 2, in which the pilot valve includes a valve stem having its upper end subject to the pressure in the chamber at the upper side of the pilot diaphragm, and having its lower end received in an isolated chamber in said pilot valve body; and an equalizer tube communicating the pressure from said upper chamber to the isolated chamber at the lower end of said valve stem.

References Cited in the file of this patent

UNITED STATES PATENTS

| | | |
|---|---|---|
| 760,488 | Root | May 24, 1904 |
| 917,443 | Jahn | Apr. 6, 1909 |
| 1,091,536 | Ross | Mar. 31, 1914 |
| 1,685,205 | Stein | Sept. 25, 1928 |
| 1,725,374 | Rush | Aug. 20, 1929 |
| 1,745,059 | Rush | Jan. 28, 1930 |
| 1,787,686 | Kerr | Jan. 6, 1931 |
| 2,182,873 | King | Dec. 12, 1939 |
| 2,291,731 | Lake et al. | Aug. 4, 1942 |
| 2,377,227 | Griswold | May 29, 1945 |
| 2,417,357 | Griswold | Mar. 11, 1947 |
| 2,421,325 | Griswold | May 27, 1947 |
| 2,422,758 | Temple | June 24, 1947 |
| 2,803,264 | Griswold | Aug. 20, 1957 |